FIG. I

INVENTORS.
PHILIP N. BRAUN.
FREDRICE MEIER.
BY
D. Emmett Thompson
ATTORNEY.

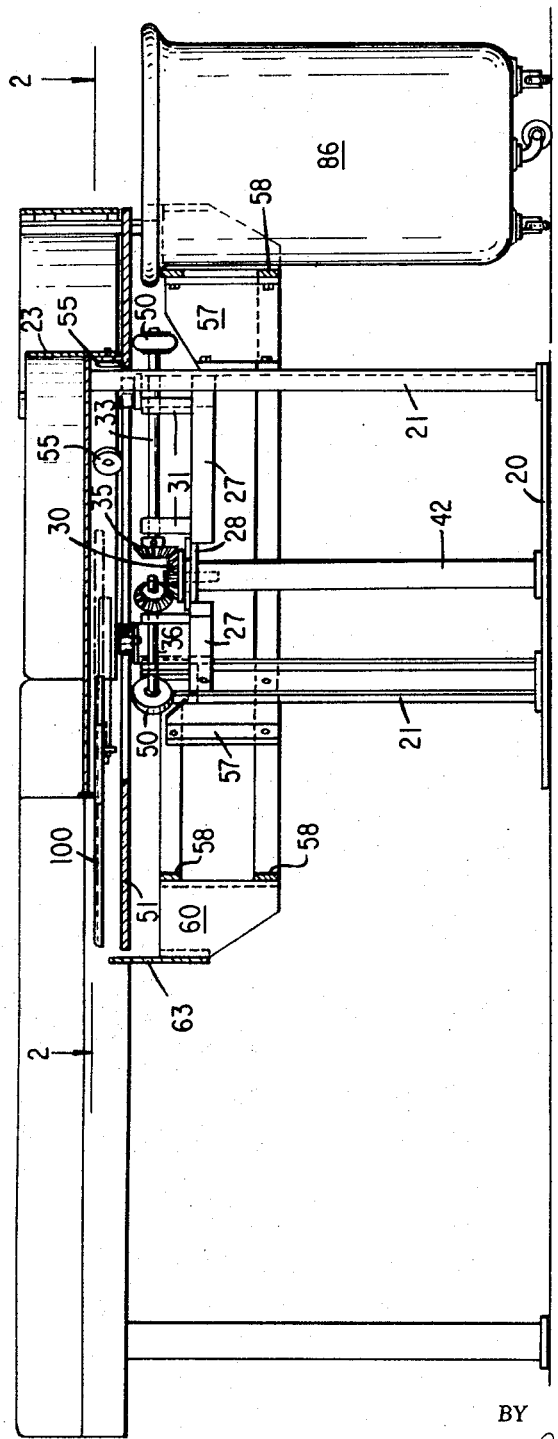

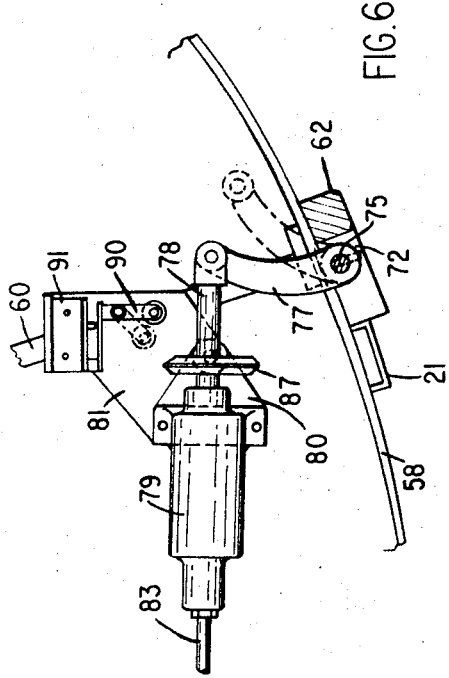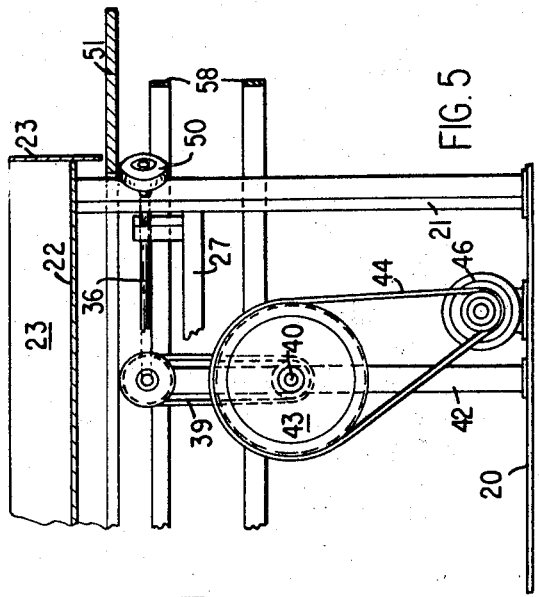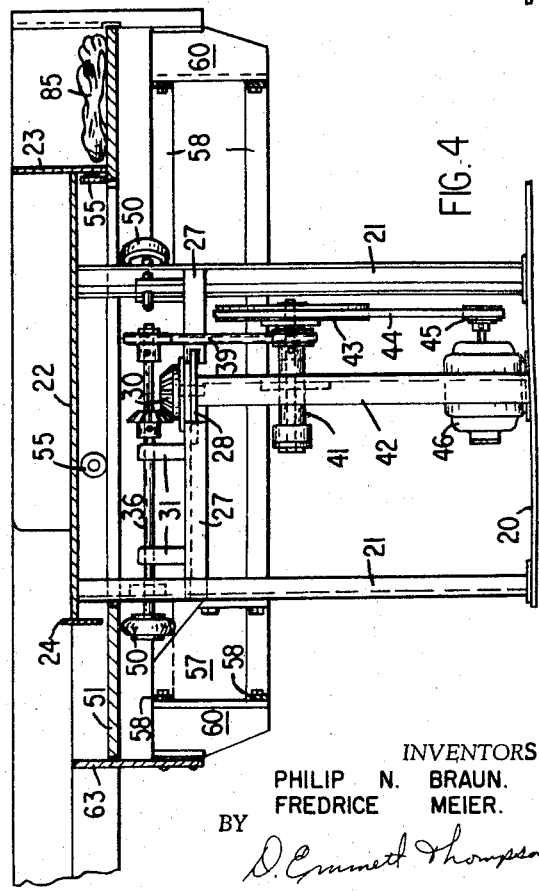

June 10, 1969  P. N. BRAUN ET AL  3,448,869
APPARATUS FOR MARKING AND CLASSIFYING ARTICLES OF LAUNDRY
Filed July 7, 1966  Sheet 6 of 9
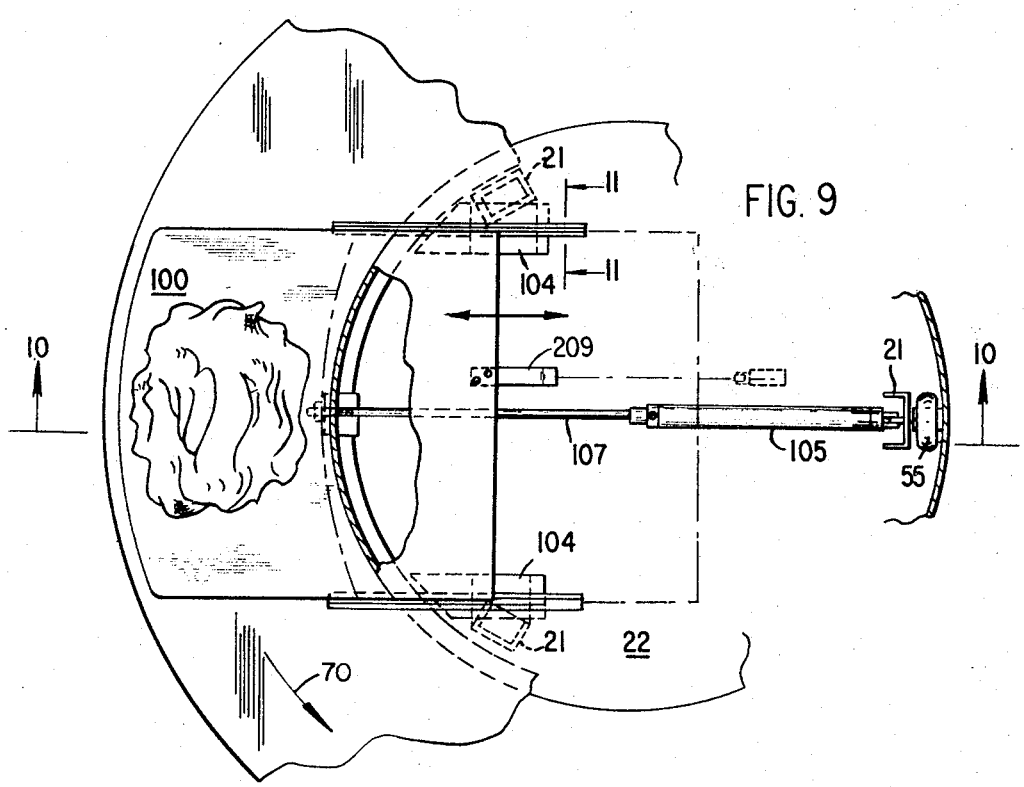
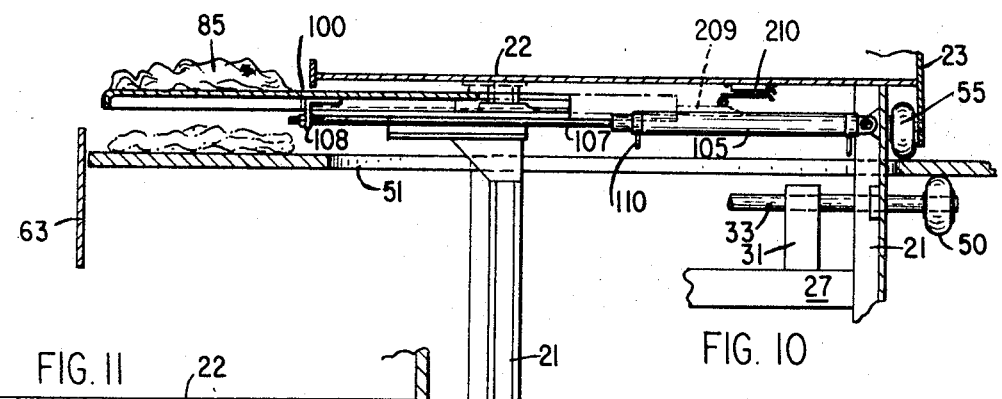
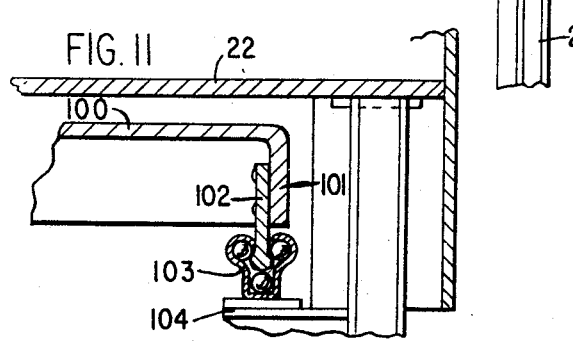
INVENTORS.
PHILIP N. BRAUN.
FREDRICE MEIER.
BY D. Emmett Thompson
ATTORNEY.

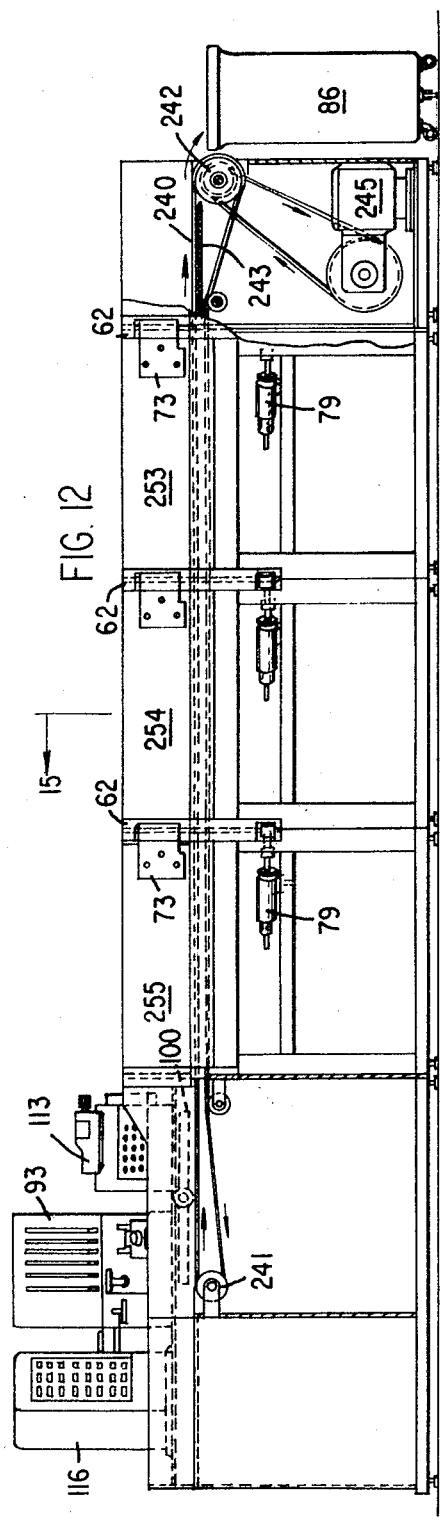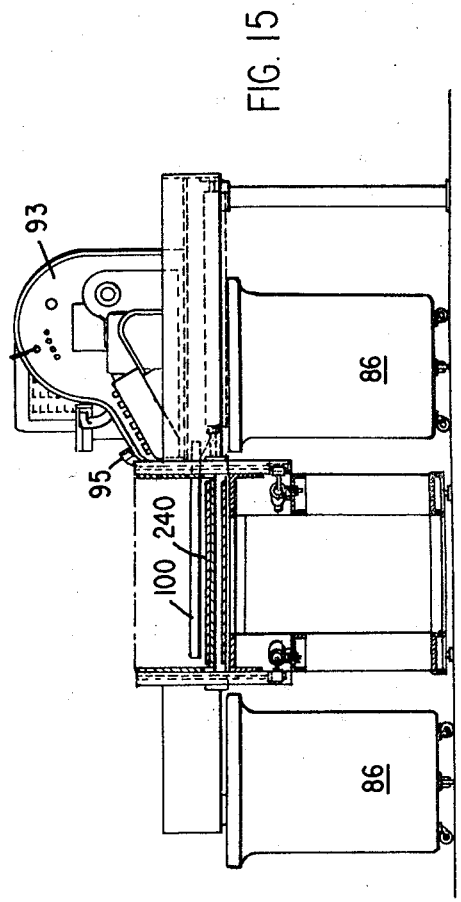

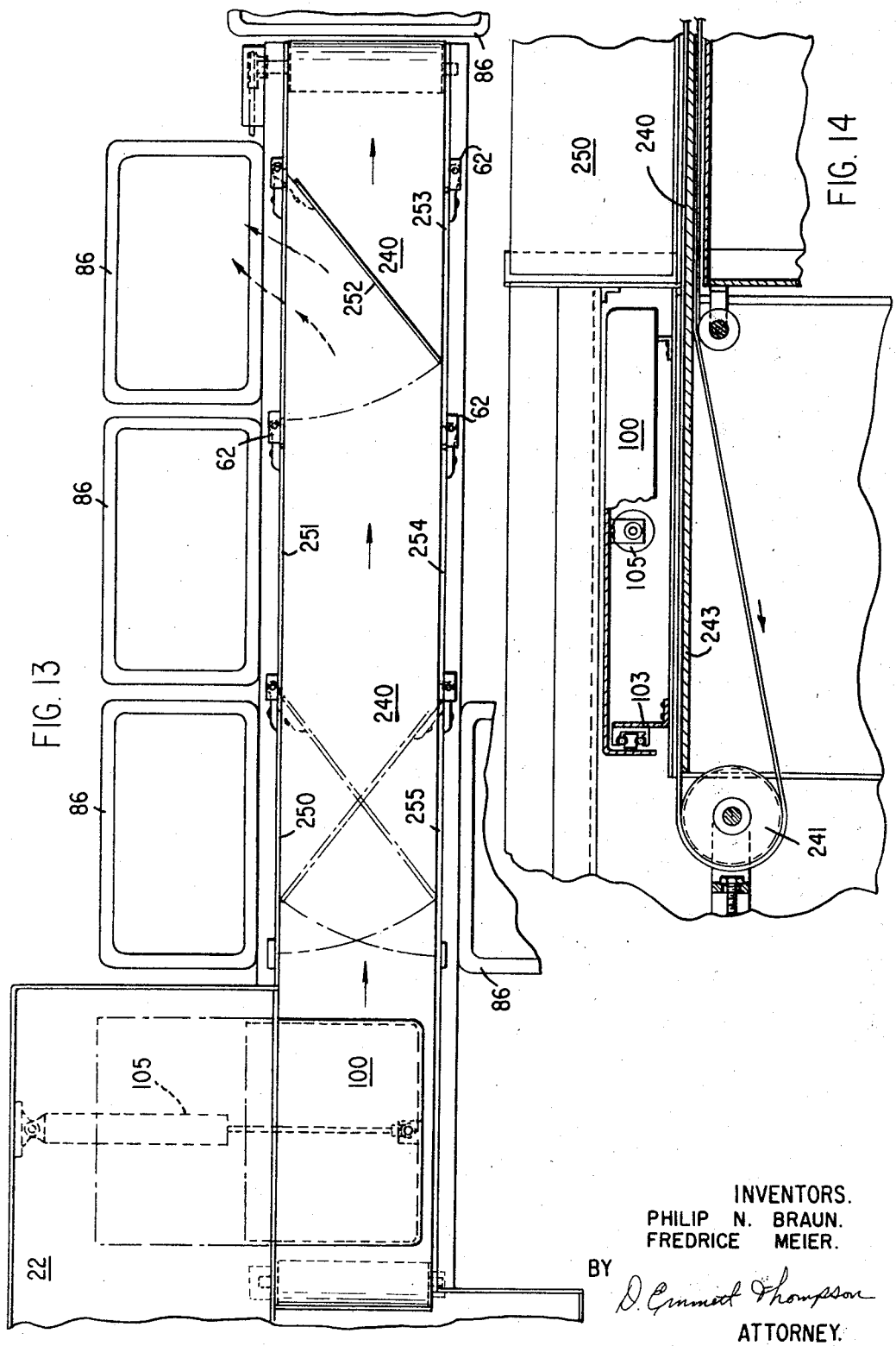

INVENTORS.
PHILIP N. BRAUN.
FREDRICE MEIER.
BY
ATTORNEY.

United States Patent Office 3,448,869
Patented June 10, 1969

3,448,869
APPARATUS FOR MARKING AND CLASSIFYING ARTICLES OF LAUNDRY
Philip N. Braun and Fredrice Meier, Syracuse, N.Y., assignors to Tag-O-Matic Machine Co., Inc., Syracuse, N.Y., a corporation of New York
Filed July 7, 1966, Ser. No. 563,571
Int. Cl. B65g 47/51, 47/80
U.S. Cl. 214—11     3 Claims

ABSTRACT OF THE DISCLOSURE

Upon operation of the laundry marking machine, the marked article is released on a temporary support from which the article is transferred to a conveyor, as by moving the support from under the article. The conveyor is provided with selectively operated gates for discharge of an article from the conveyor at a selected station. Operation of a switch effects actuation of the selected gate and provides power for the marking machine. Actuation of a second switch operates the marking machine through a cycle, at the end of which the marked article is deposited on the support and thence transferred therefrom to the conveyor.

---

This invention relates to apparatus for marking and classifying articles in laundries and dry-cleaning establishments.

The apparatus consists of a laundry marking machine which is operable, when actuated through a cycle, to mark and release an article. There is a conveyor for conveying the marked article to and past a plurality of discharge stations, at each of which there is transfer means operable to transfer the marked article from the conveyor. The transfer means are selectively operated to effect discharge of an article from the conveyor at a selected discharge station. The apparatus further includes means for temporarily supporting the article above the conveyor and, upon the marking of the article, a transition of the article is effected from the temporary support to the conveyor.

The invention has as an object, marking and classifying apparatus embodying a particularly compact structure occupying materially less floor area than that occupied by such apparatus now in conventional use. The apparatus is particularly convenient to operate and functions efficiently to mark and classify all types of articles regardless of size, kind and shape.

The invention consists in the novel features and in the combinations and constructions hereinafter set forth and claimed.

In describing this invention, reference is had to the accompanying drawings in which like characters designate corresponding parts in all the views.

In the drawings:

FIGURE 3 is a view taken on line 3—3, FIGURE 2.

FIGURE 4 is a view taken on line 4—4, FIGURE 2.

FIGURE 5 is a view, looking to the left of FIGURE 4.

FIGURE 6 is an enlarged view of one of the transfer gate operating mechanisms.

FIGURE 9 is a plan view of the article supporting shelf and the fluid operating cylinder for operating it, with parts broken away and parts in section.

FIGURE 10 is a view, taken on a line corresponding to line 10—10, FIGURE 9.

FIGURE 11 is a view taken on line 11—11, FIGURE 9.

FIGURE 12 is a front elevational view, with parts broken way and parts in section, showing a modified form of conveyor of the endless belt type.

FIGURE 13 is a top plan view of the conveyor arrangement shown in FIGURE 12.

FIGURE 14 is an enlarged sectional view of the left portion of the conveyor shown in FIGURES 12 and 13.

FIGURE 15 is a view taken on line 15—15, FIGURE 12.

Figure 1:
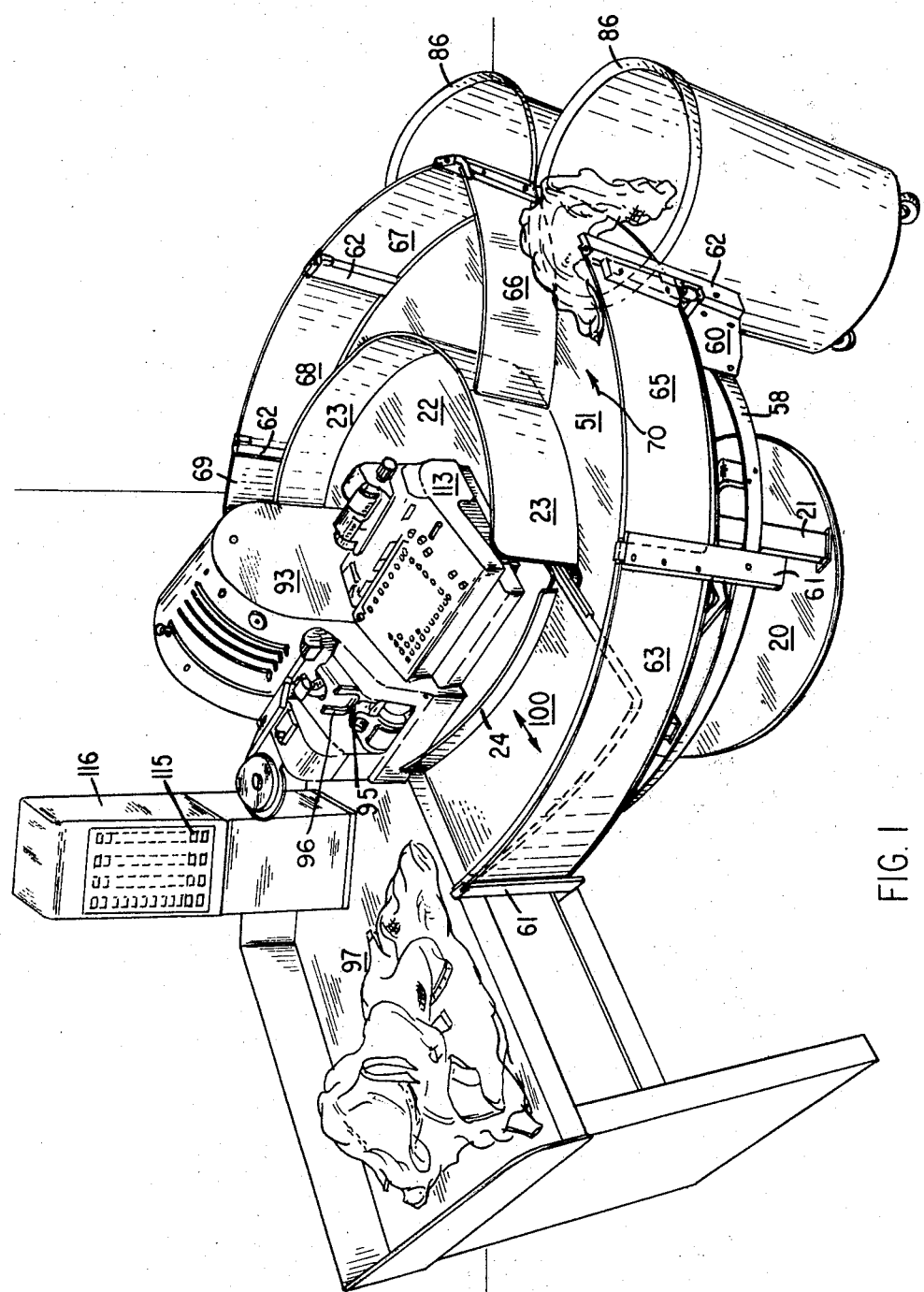
FIGURE 1 is a perspective view of an article marking and classifying apparatus embodying our invention.

The framework of the apparatus, in the arrangement shown in FIGURE 1, consists of a circular base 20 and three supporting posts 21 extending upwardly from the base, these posts being formed of channel iron. A circular flat table 22 is affixed to the upper ends of the leg members 21 and has affixed to its periphery a vertically disposed curved side wall 23. The side wall 23 extends upwardly from the table plate 22, and also downwardly therefrom. A portion 24 of the wall 23 is of reduced height.

Figure 2:
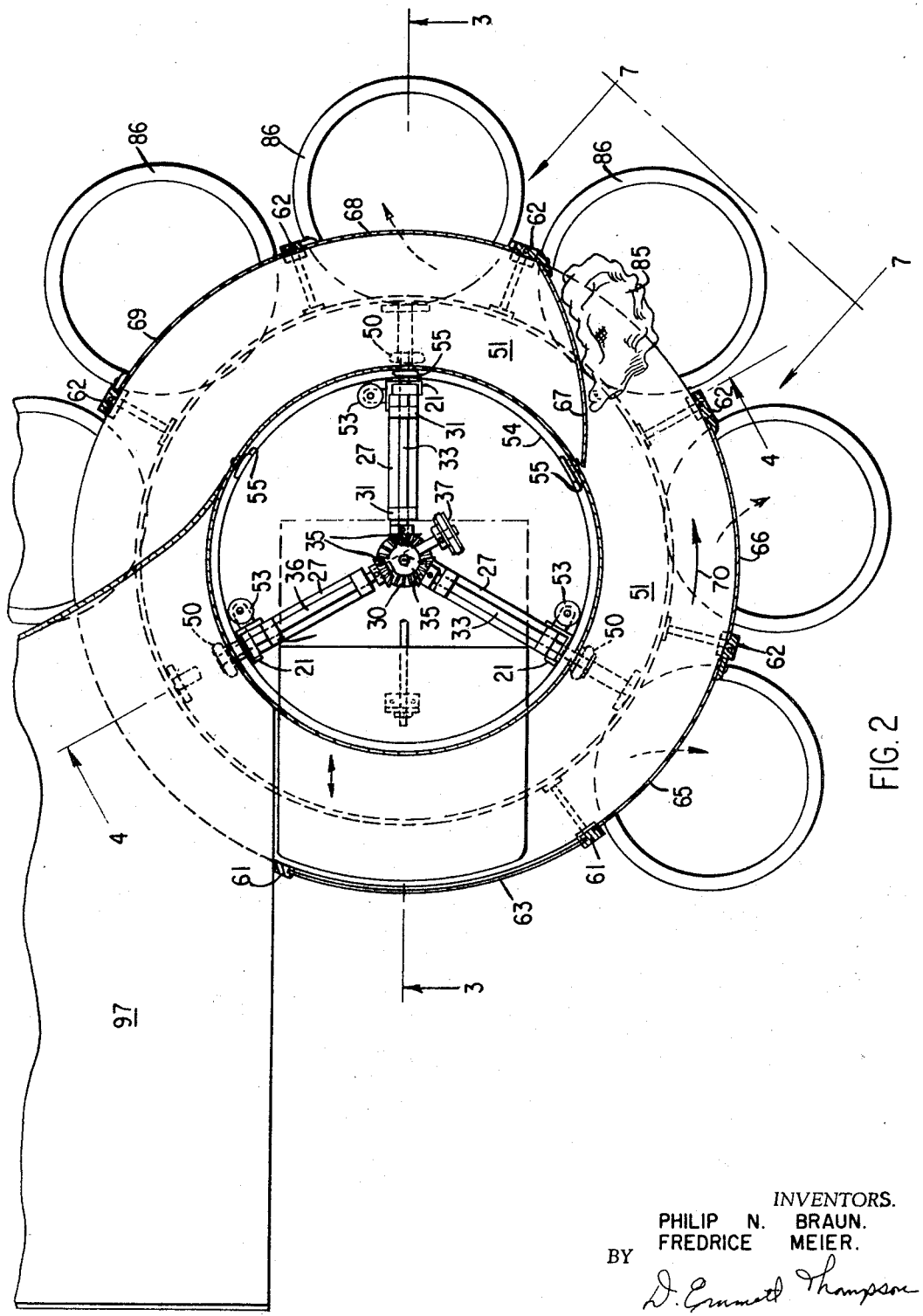
FIGURE 2 is a top plan view of the circular conveyor, the view being taken on line 2—2, FIGURE 3.
Figure 8:
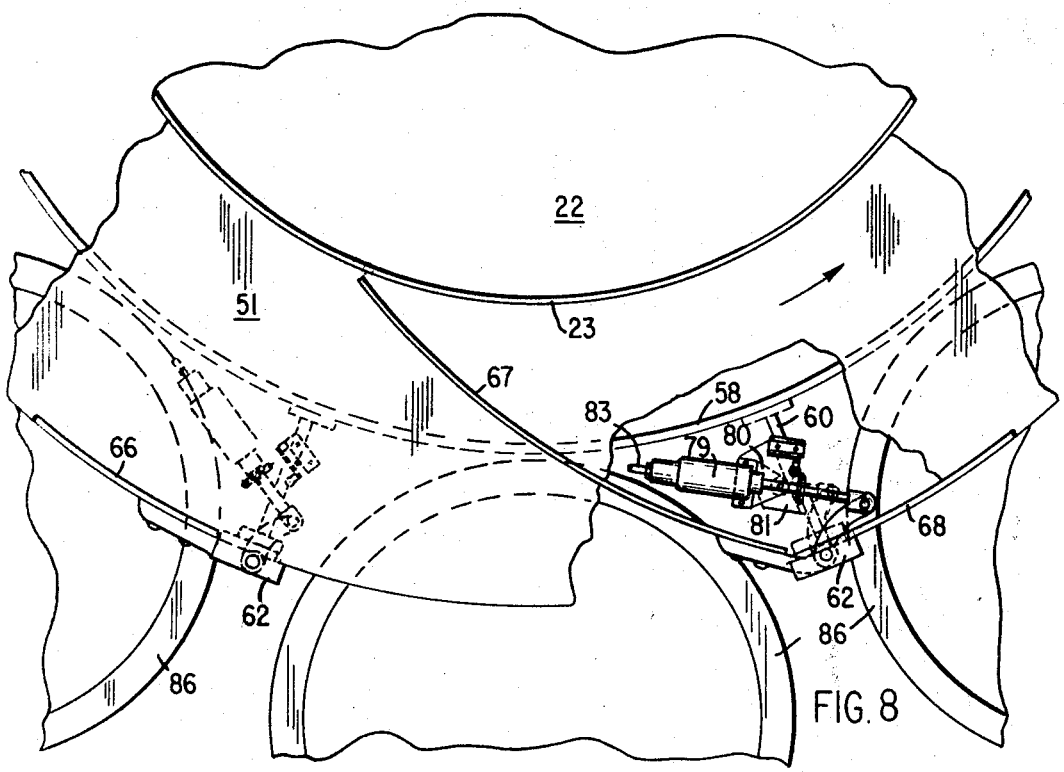
FIGURE 8 is a plan view of the structure shown in FIGURE 7, showing one of the transfer gates moved to open position.
Figure 7:
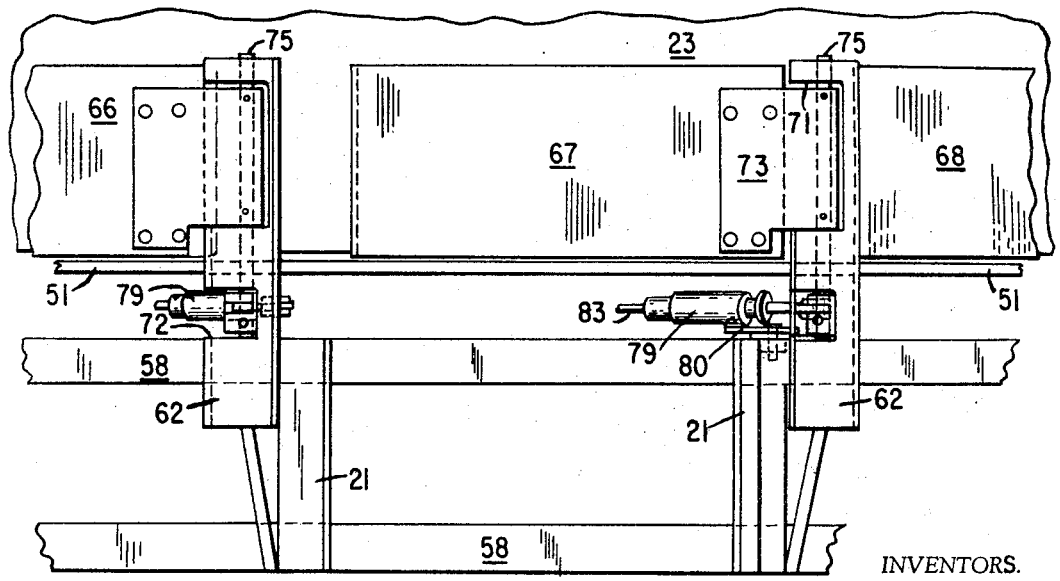
FIGURE 7 is a side elevational view of a portion of the conveyor, the view being indicated by line 7—7, FIGURE 2.

There is a cross member 27 fixed to each of the legs 21 and extending inwardly therefrom, see FIGURES 2, 3 and 4. The inner ends of the cross members 27 are secured to a plate 28 in which there is journalled, for rotation about a vertical axis, a miter gear 30.

A pair of bearing members 31 is fixed to the upper surface of each of the cross members 27. A shaft 33 is journalled in the bearing members 31 mounted on two of the cross members 27. These shafts extend radially from the axis of the gear 30, and are provided on their inner ends with miter gears 35 arranged in mesh with the gear 30.

A shaft 36 is journalled in the bearing members 31 carried by the third cross member 27. The inner end of this shaft is also provided with a miter gear 35, but the shaft extends diametrically of the gear 30 and therebeyond, and is provided with a belt pulley 37 to receive a belt 39 which is also trained about a pulley fixed to a shaft 40 journalled in a horizontally disposed sleeve 41 fixedly secured in a center post 42. The shaft 40 is also provided with a larger pulley 43 to receive a belt 44 also trained over a pulley 45 fixed on the output shaft of a driving motor 46 secured to the base 20.

It will be apparent that when the motor 46 is energized, rotation is imparted to the shafts 33, 36. These shafts extend through apertures in the posts 21, and the outer ends of the shafts are provided with friction rolls 50 which serve to support and drive an annular conveyor plate 51. There is a guide roller 53 mounted on each of the posts 21 for rotation about a vertical axis. These rollers engage the inner edge 54 of the conveyor 51 and serve to maintain it centered in respect to the axis of the gear 30. Also, rollers 55 are mounted on the depending portion of the side wall 23. The rollers 55 engage the upper surface of the conveyor 51 and serve to maintain the conveyor positioned on the friction drive rolls 50. Accordingly, with this arrangement, continuous rotation is imparted to the annular conveyor plate 51 by motor 46. It will be observed that the conveyor plate extends radially an appreciable distance outwardly from the side wall 23.

The framework also includes angle brackets 57 fixed to the supporting posts 21, see FIGURES 3 and 4. Circular members 58 are secured to the brackets 57. The circular members 58 are positioned below the conveyor plate 51, and serve to support brackets 60. Vertically disposed members 61, 62, are attached to the brackets 60, these members extending upwardly beyond the surface of the conveyor 51.

Referring to FIGURES 1 and 2, it will be observed that there are two of the vertically disposed members 61, and there are five of the members 62. The members 61 serve to fixedly support a circular wall member 63. Transfer members, in the form of curved wall gates 65, 66, 67, 68 and 69, are pivotally mounted on the members 62, and are selectively movable inwardly over the conveyor 51 to effect discharge of articles therefrom. The conveyor 51 is rotated in a counter-clockwise direction in plane view, as indicated by the arrows 70, in FIGURES 1, 2 and 9.

The members 62 are formed with notches 71, 72. Each of the transfer gates 65–69 is provided with a hinge member 73 positioned in the notches 71, each hinge member being fixedly secured to a pintle rod 75 journalled vertically in the members 62 and extending into the notches 72.

An arm 77 is fixedly secured to the lower end of each pintle rod 75, the arms extending inwardly from the notches 72 and being pivotally connected at the inner ends to piston rods 78 extending from cylinders 79. The cylinders 79 are mounted on brackets 80 which, in turn, are pivotally mounted on plates 81 carried by the brackets 60. The arrangement is such that when fluid under pressure is admitted to a cylinder through conduit 83, the gates 65–69, connected to the piston rod of that cylinder, is swung inwardly over the conveyor 51. In FIGURE 2, the gate 67 is shown moved inwardly to effect transfer of the article 85 from the conveyor 51 into the receptacle 86. The pistons in the cylinders 79 are returned by spring pressure. A disk 87 is fixed to each of the piston rods 78 and as the piston rod moves out of the cylinder 79, the disk 87 engages an actuator 90 to close the contacts of a switch 91. The actuator 90 is pivotally mounted so that, upon return movement of the piston and disk 87, the switch 91 is not again actuated, see FIGURE 6.

The centrally located table plate 22 serves as a convenient support for the article marking machine 93. This machine may be of the type disclosed in Patent No. 2,887,314, issued May 19, 1959. The article to be marked is placed upon a platen 95 and is clamped thereto by a clamp member 96, FIGURE 1. The platen 95 is moved upwardly when the machine is actuated to affix an identification tag to the article. As shown in FIGURE 1, a sorting table 97 may be arranged alongside the classifier for the convenience of the operator.

An article support is provided for supporting articles while being marked by the marking machine 93. In the arrangement disclosed, this support consists of a shelf member 100 formed with depending side flanges 101 to which are secured track members 102 having sliding engagement with guideways 103. The guideways 103 are mounted on brackets 104 fixed to a pair of the supporting legs 21, see FIGURES 10 and 11. The shelf 100 is positioned beneath the central table plate 22 and is movable radially thereof on the guideways 103. This movement is effected by fluid operated means including a cylinder 105 pivotally mounted at one end to the third leg 21. The piston rod 107 is connected at its free end to the shelf 100 by angle bracket 108. When fluid under pressure is admitted to the rear end of the cylinder 105, the shelf is moved forwardly to the position shown in FIGURES 1, 2, 9 and 10. Referring to FIGURE 1, it will be seen that the shelf 100 is placed in front of the marking machine 93 and accordingly is effective to support an article, such as a sheet, out of contact with the conveyor 51. When air is admitted to the forward end of the cylinder, through the conduit 110, FIGURE 10, the shelf 100 is moved inwardly under the table 22, whereby transition of the article 85, FIGURE 10 is effected from the shelf to the conveyor 51.

Figure 16:
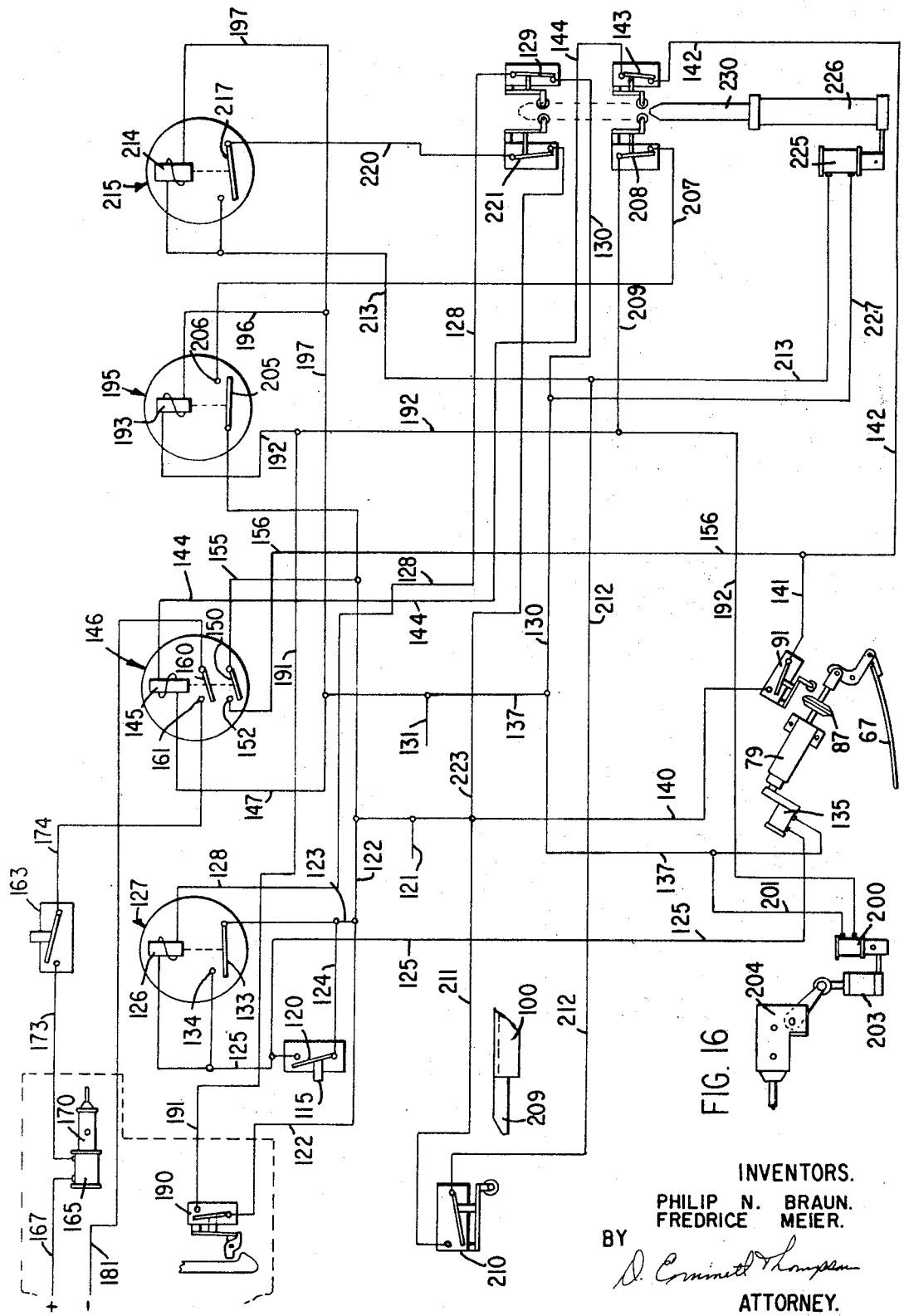
FIGURE 16 is a schematic wiring diagram of the circuitry involved for the operation of the apparatus.

The gate cylinder 79 and the support cylinder 105 are controlled by solenoid valves which, in turn, are controlled by the circuitry shown in FIGURE 16.

The operation of the apparatus is as follows:

The operator places the invoice for the bundle of laundry in the listing machine 113 which may also be conveniently positioned upon the table plate 22, and this machine is equipped with print type wheels to print on the invoice a listing of the articles marked, together with the price for the service on each article. Such machines are conventional. The operator then selects an article from a bundle and places it on the marking machine platen 95. A button 115 on the console 116, which may be conveniently located on the sorting table 97, as shown in FIGURE 1, is depressed, the button corresponding to the classification for the article. For example, if a sheet has been placed on the marking machine, the sheet button is depressed.

Referring to the wiring diagram FIGURE 16, upon actuation of the button 115, upper left portion of the figure, the contacts of switch 120 are closed. This establishes a circuit from the hot side 121 of the supply through wires 122, 123, 124, contacts of switch 120, wire 125, to the coil 126, of relay 127, the opposite side of which is connected by wire 128, through closed contacts of switch 129, wire 130, to the common side 131 of the supply. When relay 127 is so energized, the contact 133 thereof is moved into engagement with the contact 134. This provides a shunt circuit with the switch 120 to hold relay 127 energized.

Wire 125 also extends from switch 120 to the solenoid valve 135, the opposite side of which is connected to the return side 131 of the supply through wire 137. When energized, the valve 135 provides fluid pressure against the piston in cylinder 79 to effect movement of the associated discharge gate over the conveyor 51 for discharge of the article into the proper receptacle 86, one of which is positioned at each discharge station for the reception of an article discharged from the conveyor 51. During this movement of the gate, the cam 87 effects a momentary closing of the contacts of switch 91. This provides a circuit from the side 121 of the source, through wire 140, switch 91, wires 141, 142, closed contacts of switch 143, wire 144, to coil 145, of relay 146, the opposite side of the coil being connected by wire 147 to the common side 131. With coil 145 energized by the pulse from the switch 91, contact 150 of the relay is moved into engagement with contact 152. Contact 150 is connected by wires 155, 122, to the side 121. Contact 152 is connected by wire 156 to wire 142 to complete the feed through switch 143 to coil 145. Accordingly, a hold circuit is established for relay 146 as long as the contacts of switch 143 remain closed.

With the coil 145 energized, contact 160 is also moved into engagement with contact 161 to provide a circuit for energizing the marking machine 93. After the operator has placed the invoice in the listing machine and actuated the button 115 of the proper classification switch 120, a switch 163 is actuated. Referring to FIGURE 16, a solenoid valve 165, located in the marking machine 93, is energized by operation of the switch 163 to provide fluid power to a cylinder 170 which functions to run the marking machine through its cycle of operation, causing the platen 95 to move upwardly to mark the article and then return to normal position. The solenoid valve 165 is connected to a supply 167. The opposite side of the valve is connected by wire 173, through switch 163, wire 174, closed contacts 160, 161, wire 180 to the side 181.

After the article has been marked by the marking machine 93, the platen 95 returns to normal position, closing the contacts of switch 190. A circuit is then established from the side 121, through wire 122, switch 190, wires 191, 192, to coil 193, of relay 195. The opposite side of the coil is connected by wire 196 to the side 131 of the supply. Wire 192 also extends to the solenoid valve 200. The opposite side of the valve coil is connected to the side 131, through wires 201, 137. Valve 200, when energized, supplies fluid to cylinder 203 operatively connected to a three-way valve 204 for supplying fluid under pressure through conduit 110, to the forward end of cylinder 105, see FIGURE 10. This effects movement of shelf 100 inwardly under the table 22 to permit transition of the marked garment to the conveyor 51.

A hold circuit is provided for coil 193 from the side 121, wire 122, contact 205, now moved into engagement with contact 206, connected by wire 207 through closed contacts of switch 208, wire 209, to wire 192, this arrangement also providing a lock in circuit for the solenoid valve 200 through the contacts of switch 208.

When the shelf 100 is moved inwardly, a cam member 209 affixed thereto, see FIGURES 9 and 10, actuates a switch 210, completing a circuit from the side 121, wire 211, switch 210, wires 212, 213, coil 214 of relay 215, the opposite side of which is connected by wire 197, to the common side 131. With coil 214 energized, contact 217 moves into engagement with contact 218, which is connected to wire 213, providing a hold circuit for coil 214, inasmuch as contact 217 is connected by wire 220, through switch 221, and wire 223 to the side 121.

It will be observed, the wire 213 also extends to solenoid valve 225 and thus energized, it provides fluid power to the lower end of the cylinder 226. The opposite side of valve coil is connected by wire 227, to wire 130 and thence, to the common side 131. With fluid admitted to the lower end of cylinder 226, actuator 230 moves slowly upwardly, opening the contacts of switch 143, 208, and subsequently, the contacts of switches 129, 221.

The opening of the contacts of switch 143 breaks the hold circuit to relay coil 145. Actuation of switch 208 opens the hold circuit for the relay coil 193. The opening of contacts of switch 129 interrupts the holding circuit for the relay coil 126 and actuation of switch 208 opens the hold circuit for relay coil 214 and also the solenoid valve 225, permitting the return of actuator 230 to normal position.

Accordingly, the operation briefly stated is that a selected one of the console buttons is closed. This immediately effects the opening of the corresponding gate for the discharge of the marked article into the proper receptacle 86. The operation of the gate results in energizing the interlock relay 145 which, in turn, makes power available to operate the marking machine 93 by pressing the button of switch 163. With this arrangement, it is made certain that the gate has been moved to open position before the marking machine is actuated. When the marking machine is actuated by switch 163 and times out, the return of the garment platen effects withdrawal of the shelf and energization of the timer actuator 230 which times out after the article deposited on the conveyor has been discharged through the open gate, whereupon the gate is again closed and the circuitry restored to normal condition.

The arrangement shown in FIGURES 12-15 varies only in the type of conveyor employed. In these figures, the conveyor is in the form of an endless belt 240 trained over pulleys 241, 242, mounted in a suitable framework. The upper run of the belt is supported by a plate 243 and moves to the right in FIGURES 12 and 13. The table 22 supporting the marking machine 93 and the supporting shelf 100 are arranged at the left end of the conveyor belt. Normally, the supporting shelf 100 is extended over the conveyor belt, as shown in FIGURE 13.

There are a plurality of discharge stations along each side of the conveyor belt and there is a receiving receptacle 86 mounted at each discharge station.

There is a guide wall extending along each side of the conveyor belt and is formed by closed discharge gates 250-255. These gates correspond to the gates 65-69 in the arrangement previously described. The gates are mounted in the same manner on the uprights 62 and are operated by the same piston and cylinder structures indicated at 79 in the circular conveyor arrangement.

The control circuitry is identical with that shown in FIGURE 16 and the sequence of operations is the same. The conveyor belt 240, like the circular conveyor 51, operates continuously at relatively high speed, whereby the marked article deposited on the conveyor is quickly transported to the proper discharge station. The conveyor belt 240 is operated by the motor 245 operatively connected to the pulley 242.

It will be observed that in both arrangements the structure is particularly compact, whereby the articles in a laundry bundle are quickly classified. The supporting shelf 100 serves to adequately support the article being marked and prevents the article from being pulled along during the marking operation.

What we claim is:

1. An article marking and classifying apparatus for laundries and the like comprising a marking machine, a conveyor, an article support normally positioned above said conveyor for supporting an article to be marked by said marking machine, said marking machine being operable when actuated to mark an article positioned on said support and release the marked article, means operable upon release of the marked article to move said support under a fixed member, whereby the article drops on said conveyor, a plurality of stations spaced along said conveyor, an article transfer member at each of said discharge stations and operable when actuated to transfer an article from said conveyor, and means for actuating a selected one of said transfer members and said marking machine.

2. Apparatus as defined in claim 1 and including means operable to return said support to normal position a predetermined time subsequent to the movement of said support under said fixed member.

3. Apparatus as defined in claim 1, wherein said support is in the form of a shelf, and power means operatively connected to said shelf for moving the same under said fixed member and returning the same to normal position.

References Cited

UNITED STATES PATENTS

| | | | |
|---|---|---|---|
| 1,589,383 | 6/1926 | Garcia | 214—11 |
| 2,194,381 | 3/1940 | Cadman | 214—11 |
| 2,887,314 | 5/1959 | Braun | 226—58 |
| 3,268,096 | 8/1966 | Kitchener | 214—11 |

HUGO O. SCHULZ, *Primary Examiner.*